March 30, 1943.                H. A. SNOW                2,315,282
METHOD OF AND APPARATUS FOR DETERMINING CHARACTERISTICS OF SURFACES
            Filed Oct. 21, 1939        3 Sheets-Sheet 1
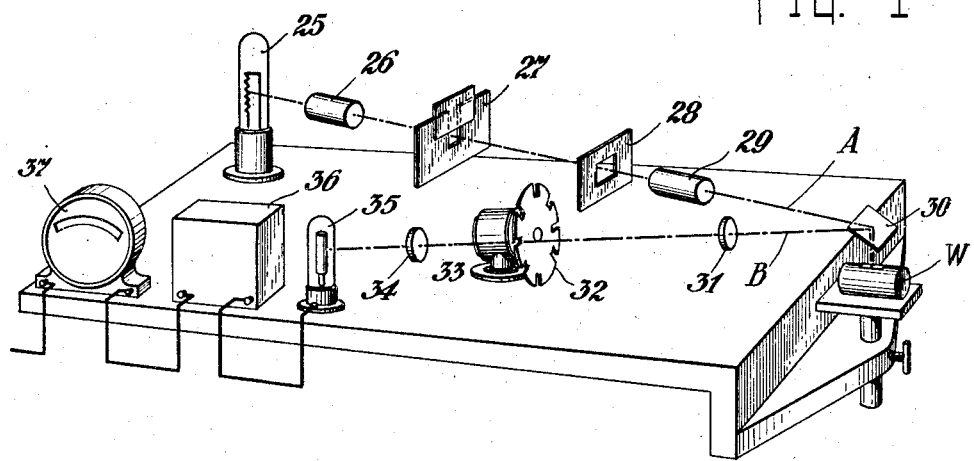
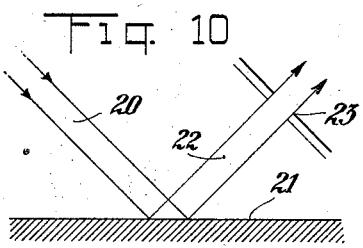
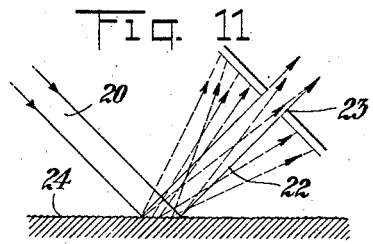
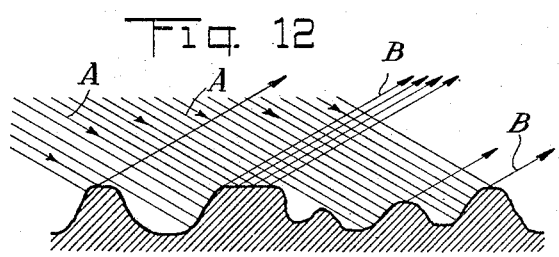
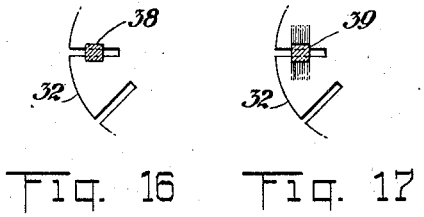
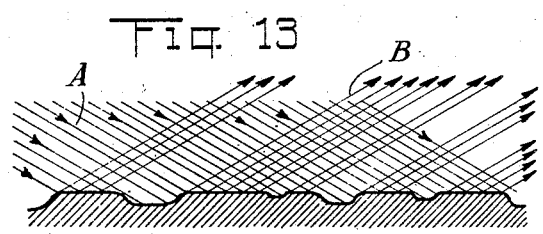
INVENTOR
*Harold A. Snow*
BY
*Blair, Curtis, Dunne + Hayward*
ATTORNEYS March 30, 1943. H. A. SNOW 2,315,282
METHOD OF AND APPARATUS FOR DETERMINING CHARACTERISTICS OF SURFACES
Filed Oct. 21, 1939 3 Sheets-Sheet 2
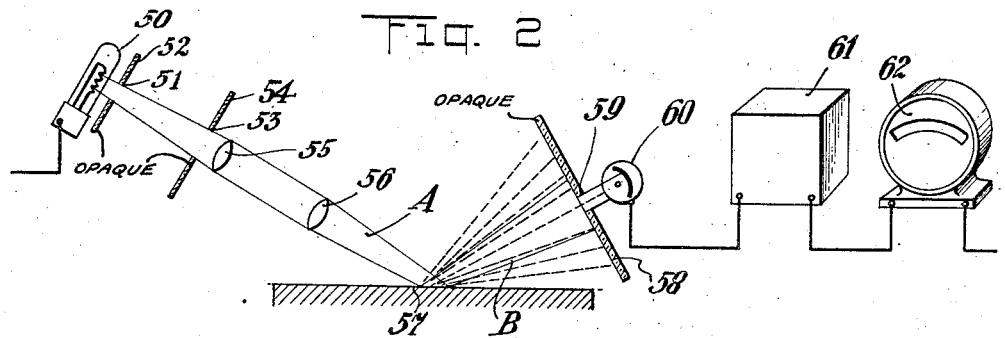
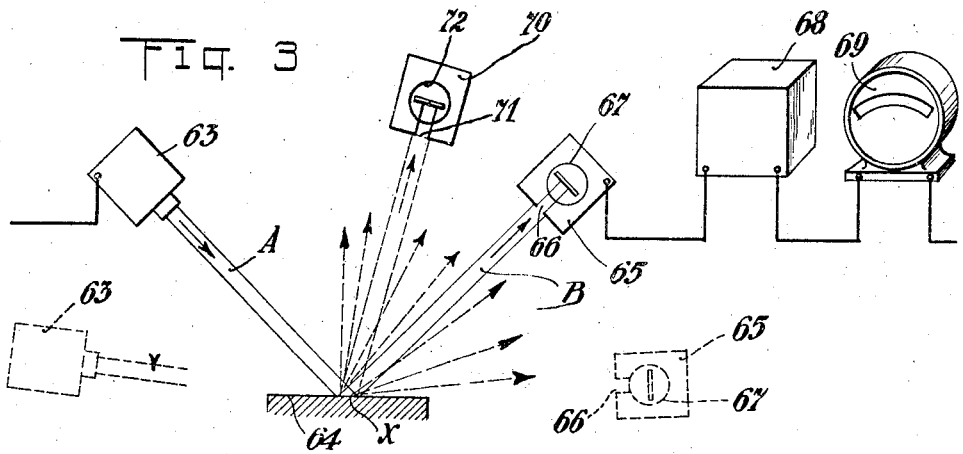
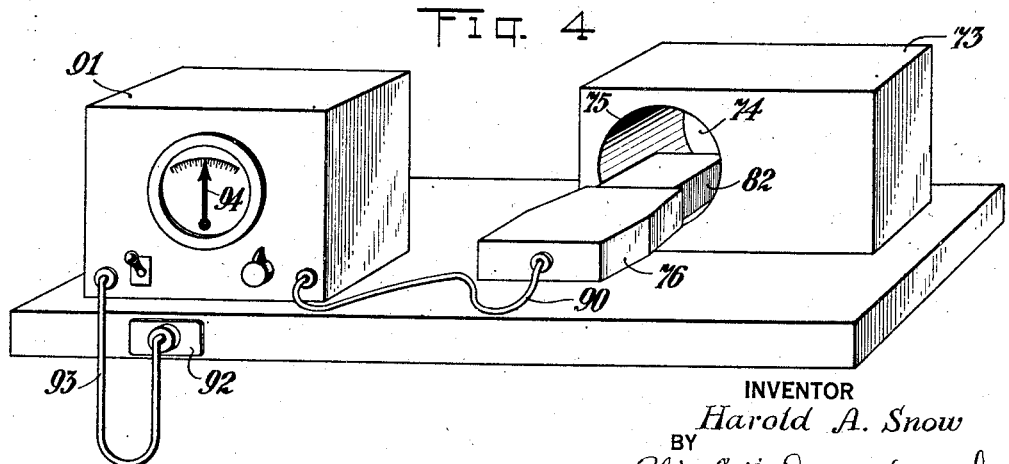
INVENTOR
Harold A. Snow
BY
ATTORNEYS March 30, 1943. H. A. SNOW 2,315,282
METHOD OF AND APPARATUS FOR DETERMINING CHARACTERISTICS OF SURFACES
Filed Oct. 21, 1939 3 Sheets-Sheet 3
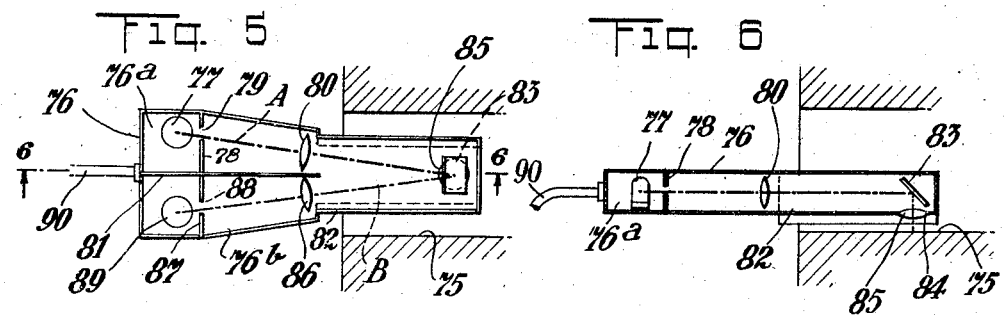
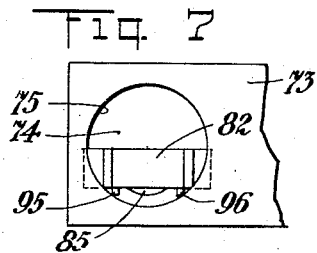
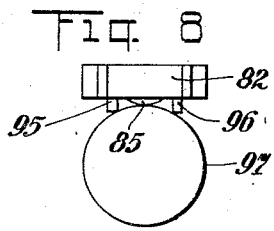
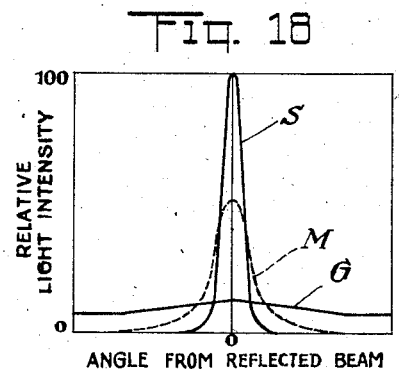
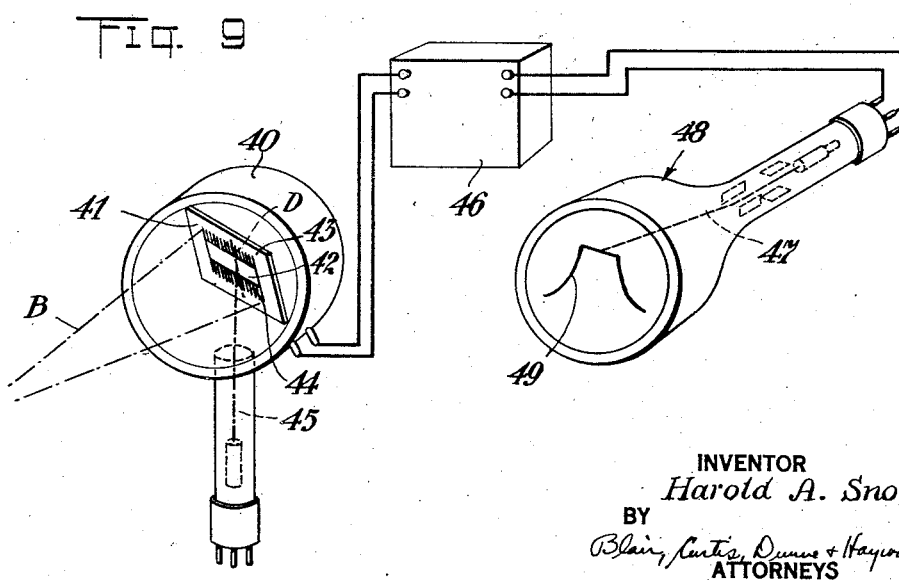
INVENTOR
Harold A. Snow
BY
Blair, Curtis, Dunne + Hayward
ATTORNEYS Patented Mar. 30, 1943

2,315,282

UNITED STATES PATENT OFFICE 2,315,282

METHOD OF AND APPARATUS FOR DETERMINING CHARACTERISTICS OF SURFACES

Harold A. Snow, Orange, N. J.

Application October 21, 1939, Serial No. 300,534

4 Claims. (Cl. 88—14)

This invention relates to a method of and apparatus for determining the characteristics of a surface, and more particularly to an apparatus for and method of measuring the smoothness of a surface.

It is among the objects of this invention to provide apparatus for determining certain characteristics of a surface, which is simple in construction and which may readily be employed by an unskilled operator to determine accurately a characteristic such as the smoothness of a surface. It is another object of this invention to provide a method in the practice of which skill is not a prerequisite, and by the practice of which a surface characteristic such as surface smoothness can be rapidly ascertained with a high degree of accuracy. Other objects will be in part apparent and in part pointed out hereinafter.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the drawings, in which are shown several embodiments of my invention,

Figure 1 is a schematic perspective of my surface measuring instrument;

Figure 2 is a schematic view of a modified form of my invention;

Figure 3 is a schematic view of another modification of my invention;

Figure 4 is a perspective view of my surface smoothness measuring apparatus;

Figure 5 is a horizontal section of the viewing head of the instrument shown in Figure 4;

Figure 6 is a vertical section taken along the line 6—6 of Figure 5;

Figures 7 and 8 are respectively diagrammatic views of the viewing head of my instrument in operating position in an interior surface and on an exterior surface;

Figure 9 is a schematic perspective of an iconoscope and an oscillograph adapted to be used in conjunction with the instruments shown in Figures 1, 2, 3 and 4;

Figure 10 schematically represents the nature of the reflection of a beam of light striking an optically smooth surface;

Figure 11 schematically represents the effect of the reflection of a beam of light striking a surface which is not optically smooth;

Figure 12 schematically represents the reflection of a beam of light striking the unpolished surface of a bearing or the like;

Figure 13 schematically represents the reflection of a beam of light striking the polished surface of a bearing or the like;

Figure 14 is a fragmentary schematic view of a portion of the light chopper shown in Figure 1 on which is reflected a beam of light from an optically smooth surface;

Figure 15 is a view similar to Figure 14, the light chopper having reflected thereon a beam of light from a surface which is not optically smooth;

Figure 16 is a graph of the voltage output of a photoelectric cell resulting from exposure to a scanned reflection of a light beam from an optically smooth surface;

Figure 17 is a graph of the voltage output of a photoelectric cell resulting from exposure to a scanned reflection of a light beam from a surface which is not optically smooth; and, Figure 18 is a graph of several curves showing relative light intensity plotted against the angle of the light sensitive element with respect to a beam of light reflected from the surface being analyzed.

Similar reference characters refer to similar parts throughout the various views of the drawings.

To clarify certain aspects of this invention, it might first be well to point out that many types of machinery, such as machine tools, internal combustion engines and other mechanisms which are called upon to operate at substantial rates of speed over extended periods of time, have numerous bearing surfaces subjected to substantial loads and required to support such loads practically indefinitely without failure, and without the necessity of being shopped for resurfacing. For illustrative purposes, a roller bearing race is characterized by such a surface, as are also the rolls which track about the race. To insure the long and uninterrupted usefulness of these surfaces, they are usually ground and polished to a high degree of accuracy and smoothness.

While bearing surfaces such as those referred to above must be quite smooth, a degree of smoothness approaching optical smoothness is not always necessary, but whatever smoothness is necessary or is attained by lapping or polishing operations is difficult or impossible to measure with any degree of accuracy. Such methods of measuring smoothness as have been available are not of much use under the requisites of high production manufacture and their use results in many cases, in decreasing accuracy under conditions of increasing smoothness of the surface being perfected. This is occasioned by reason of insufficient sensitivity of the instruments employed to surfaces approaching optical smoothness. Most of such instruments also have the inherent weakness of rendering faulty analysis by reason of wear of parts after extended use.

To illustrate certain of the features of my invention, if a beam of light such as a primary beam 20 (Figure 10) is directed against an optically smooth metallic surface 21, the reflected or secondary beam 22 is reflected at the angle of reflection and is of substantially the same concentration as the primary beam, and accordingly would pass through an orifice 23 properly positioned with respect to the secondary beam. Assuming that this same primary beam 20 is directed against a surface 24 (Figure 11) of the same material as that of surface 21 and which is not optically smooth, a certain amount of diffusion will result, as represented by the arrows, and not all of the reflected light will pass through the orifice 23. The light passing through this orifice is a reasonably well defined or secondary beam 22, and is reflected, at the ordinary angle of reflection, from the elements of the reflecting surface that are substantially parallel to the general plane of the surface. The remainder of the reflected light is diffusely reflected at various angles as indicated by the arrows from the remaining elements of the surface which are at an appreciable angle to the plane of the surface, and practically none of this diffused light passes through the orifice. A small amount of the diffusely reflected light may pass through the orifice owing to the finite dimensions of the light beam, as illustrated by the arrows, but for practical purposes this may be neglected. Accordingly, then, the amount of light, or in other words the intensity of light passing through orifice 23 is substantially proportional to the amount or percentage of the smooth area of the surface that is parallel to the general plane of the surface from which the light is reflected, and this percentage for present purposes may be called "mirror reflectance" which term is indicative of the proportion of the smooth or mirror surface to the total surface reflecting the light. The ratio of the light passing through the orifice of Figure 11 to that of Figure 10 measures directly the proportion of mirror surface in the total surface 24.

Further to illustrate this principle, a greatly enlarged profile of a comparatively rough surface is shown in Figure 12, and a beam of light directed toward this surface, i. e., the primary beam, is represented by the parallel lines A. This beam, upon striking the surface is reflected at the angle of reflection by the portions thereof which are substantially parallel to the general plane toward which the light is directed, and this reflected light is represented by the lines B. It now appears that the reflected light B, or secondary beam, comprises light reflected from the horizontal portions of the high spots or peaks of the reflecting surface, whereas the lower portions or valleys of this surface do not reflect any light in the direction of the secondary beam by reason of the angle of the primary beam with respect to the surface, although such low portions may be parallel to the general plane of the surface.

The remainder of the reflected light is diffusely reflected at various angles different from the angle of the secondary beam, by the portions of the surface which are at an appreciable angle to the general plane of the surface, and thus is not included in the secondary beam.

The amount of light reflected in the secondary beam is thus substantially proportional to the area of the higher portions of the surface that are parallel to the plane of the surface.

In bearing surfaces, the higher portions of the surface are generally most subject to wear, and the relative amount of such surface may determine the life or the load capability of the bearing, and the measure of light intensity in the secondary beam, or the mirror reflectance, thus gives a direct measure of the relative amount or percentage of surface useful for bearing purposes.

Illustratively, this surface represents the nature or condition of a roll race, for example, before being polished, and if the mirror reflectance thereof be measured, the necessity of a further operation, such as polishing upon the surface may be determined. In Figure 13, I illustrate the same surface as shown in Figure 12 subsequent to a polishing operation, which operation has substantially increased the proportion of smoothness or mirror surface to the total surface so that the mirror reflectance of the surface is increased substantially as the useful bearing surface is increased. Thus, a greater proportion of the light of primary beam A is reflected as indicated by the arrows B, which indicate the secondary or reflected beam. If then the intensity of secondary beam B be measured, it would be found that the mirror reflectance of the surface being measured has increased substantially, and assuming suitable calibration of the measuring instrument, the necessity for further polishing may readily be determined.

In the practice of my method, I project a primary beam of light through a suitable optical system, and form an image of a portion of that system, such as an aperture on the surface being measured or analyzed. The diffused light reflected by the surface is then separated from the secondary beam and the intensity of the secondary beam is measured, as for example, by scanning with a notched disc, the scanned beam then being intercepted by a photocell which results in the creation of a pulsating current. This pulsating current is then amplified and impressed upon a galvanometer or any other suitable instrument capable of measuring its amplitude.

By setting or calibrating the galvanometer or other instrument so that it registers 100 per cent when subjected to a voltage, such as would result from a beam of light reflected from an optically smooth surface, the galvanometer will then indicate the percentage of mirror reflectance of a surface less than optically smooth. This is by reason of the fact that the light reflected from the rougher surface is of less intensity, and accordingly will affect the photocell in such a manner that the cell creates a voltage of lower amplitude.

Under certain circumstances, it may be desirable to indicate visibly as by a voltage curve the value of the mirror reflectance of the surface being analyzed. In such a case, the secondary beam may be impressed on a television pickup tube, where it may be scanned in the conventional manner by an electron beam, and the resulting current amplified, and connected between the deflecting plates of a cathode ray tube, which will result in a portrayal on the fluorescent screen of the cathode ray tube of a curve the ordinates of which are amplitude and the abscissae of which are time. The character or dimensions of this curve will accordingly be an indication of the mirror reflectance of the surface being analyzed, and thus the operator can readily determine the need for further processing of the work.

Referring now to Figure 1, wherein there is schematically shown an instrument by which my method may be practiced, a source of light 25 is arranged to cast a beam through a condensing lens 26 which directs the light through a pair of apertures 27 and 28, the former of which is adjustable for a purpose described hereinbelow. The light then passes through a lens system 29 so that the primary beam A is directed against a reflector 30. Reflector 30 is positioned at a suitable angle to direct beam A against a work piece W, the surface of which is to be analyzed. Lenses 26 and 29 and apertures 27 and 28, together with reflector 30, constitute an optical system so arranged and focused that an image of aperture 27 is formed on the surface of work piece W. The beam is reflected from the work piece back against reflector 30 to form a secondary beam B, which is projected through a lens 31 of such focal length as to produce an image of aperture 28 at the surface of a light chopper or scanning disc 32 adapted to be rotated by a suitable motor or the like 33. Rotation of disc 32 interrupts secondary beam B so that light passes intermittently therethrough preferably to and through another lens 34 and thence against the sensitive portion of a photocell 35.

Photocell 35 is so located that an image of the illuminated area of the work piece W is formed thereon, and the size of the illuminated area of the work piece is controlled by the adjustable aperture 27. It is desirable to control the size of the illuminated area because of the varying curvatures of different surfaces being analyzed, i. e. a surface of small radius of curvature is more accurately analyzed if its area of illumination is quite narrow.

As noted above, at the disc 32, the secondary beam B is forcused to form an image of aperture 28 when the surface being analyzed is optically smooth. This image is represented by the shaded rectangle 38 (Figure 14) which illustrates the image as well defined and superimposed on one of the slots of the disc. When the surface being analyzed is a commercial cylindrical surface, such as hat of the work piece W (Figure 1) it usually has numerous parallel scratches or toolmarks normal to the axis of the work piece and extending therearound. These scratches diffuse part of the light deflected from the surface, principally in a plane perpendicular to the direction of the scratches, and parallel to the axis of the work piece, and result in an image at the slotted disc 32 such as image 39 (Figure 15) the diffused light being indicated by the shaded regions above and below the central brighter portion of the image.

By reason of the rotation of scanning disc 32, the image of aperture 28 on the disc is scanned, allowing light to pass through but one disc slot at any one instant, and this light falling on photocell 35 produces an electrical voltage pulse approximately proportional in amplitude to the amount of light passing through the disc slot at any instant. The amplitude of the voltage pulses is amplified by a suitable amplifier 36 which is in turn connected to a galvanometer 37 or the like which measures the amplitude of the amplified voltage. The term galvanometer is used in a general sense and is meant to include such current or voltage indicating instruments as may be suitably used. For example, a peak indicating meter may advantageously be employed to indicate heights of voltage impulses such as shown in Figures 16 and 17 which correspond to the intensity of the brightest portion of the images being scanned as shown in Figures 14 and 15.

Preferably galvanometer 37 is calibrated to register 100 when photocell 35 is subjected to reflected light from an optically smooth surface. Under these conditions, the galvanometer will measure the relative intensity of light reflected from a surface less than optically smooth, and this percentage will accordingly be approximately directly proportional to the smoothness of the surface being analyzed.

If the surface being analyzed is less than optically smooth, secondary beam B will include more or less diffused light. Because of the finite dimensions required in practical apparatus, a certain amount of diffused light is contained within the secondary beam and passes through the aperture, i. e., for example, aperture 23 (Figure 11) or through one of the slots in the scanning disc 32 (Figure 1). With a relatively smooth reflecting surface, the amount of diffused light passing through the aperture is quite small as compared to the light in the secondary beam, and thus may be ignored for practical purposes. As the roughness of the surface increases, so does the diffusion of reflected light, and hence less light is contained in the secondary beam, and a greater amount of light is diffused with the result that more diffused light passes through the aperture, resulting, of course, in a greater error of measurement. From this, it will appear that the inherent accuracy is less for rough surfaces, but increases as the smoothness of the surface approaches optical smoothness.

With reference to Figures 14 and 15, it will appear that the position of the light images may be changing substantially without appreciably affecting the operation of the scanning system, as the images may be displaced considerably from the positions shown and still be well within the path of the disc slots during their rotation. Hence, an appreciable change in the angle of the secondary beam produces but a negligible change in operation which, in turn, precludes the necessity of excessive accuracy in the positioning of the work piece being analyzed. Furthermore, the slots in scanning disc 32 are preferably quite narrow, as this reduces the amount of diffused light passing through an individual slot, as it scans the central bright portion of the image, thus minimizing errors resulting from such diffused light.

Figures 16 and 17 respectively show the voltage curves corresponding to the intensities of the images in Figures 14 and 15, and thus the peak amplitudes of the voltage pulses produced by the scanning of the images are substantially proportional to the illumination intensity of the central portion of the images, and as pointed out above, the position of the images may be shifted substantially in any direction without materially varying the amplitude or shape of the voltage pulses.

If desired, the shape of the voltage pulses, as illustrated in Figures 14 and 15, may be shown directly by an oscillograph synchronized to the rotation of the scanning slots in disc 32 (Figure 1). To this end a cathode ray oscillograph may be used with its horizontal deflection synchronized to the scanning slots in disc 32, and its vertical deflection operated by the voltage pulses so that a curve will be traced repeatedly, and which will appear constantly on the fluorescent screen of the tube, as long as the work surface being analyzed is in position, thus providing an instantaneous measure of the characteristics of the test surface.

Further in this connection and with reference to Figure 9, the images illustrated on scanning discs 32 in Figures 14 and 15 may be directed on the screen of a television pickup tube 40, such as an iconoscope. The secondary light beam B falls on the screen 41 of the iconoscope, producing an image having a bright central portion 42 and weaker diffused portions 43 and 44. The scanning beam 45 of the iconoscope may be moved vertically by any suitable deflecting means to strike screen 41 over the path indicated by the dotted line D. This scanning produces voltage pulses which are amplified by an amplifier 46, and the amplified pulses are utilized to deflect vertically the beam 47 of a cathode ray oscillograph generally indicated at 48 in accordance with the instantaneous amplitude of the amplified voltage pulses, and simultaneously the cathode ray beam 47 may be moved horizontally in synchronism with the motion of the scanning beam 45 of the iconoscope. Thus, a curve 49 is traced on the cathode ray screen and indicates the relative light intensities along the path D of the scanning beam 45. Repeated reproduction of the curve at a high rate results in an apparently steady visible curve by reason of the persistence of vision.

Referring now to Figure 2, wherein there is shown a modified form of my instrument, light from a suitable source 50 passes through a limiting aperture 51 formed in an opaque plate or the like 52, and thence through a second aperture 53 formed in another opaque plate or the like 54. From aperture 53 the light next passes through a lens system 55, 56 to form a primary beam A which is directed onto a test or work piece 57. Aperture 53 may be located in other suitable positions as, for example, at or below lens element 55. The lens system is so arranged, however, that an image of aperture 51 is brought to a sharp focus at surface 57.

When surface 57 is comparatively smooth, i. e. is less than optically smooth, having for example, a mirror reflectance of 50 per cent, the primary beam A is so reflected by this surface that the reflected light comprises a relatively well defined secondary beam B, and, as indicated by the dotted lines in Figure 2, diffused light spreads in various directions from the illuminated area of surface 57.

Apertures 51 and 53, and lens system 55, 56 are so arranged with respect to surface 57 that not only, as pointed out above, is an image of aperture 51 focused at the surface 57, but also an image of aperture 53 is formed at an opaque plate 58 which has formed therein a third aperture 59. Preferably lens element 56 of the lens system is of relatively short focal length with the result that the angle included by secondary beam B is relatively large. Also aperture 59 is preferably relatively small as compared to the image of aperture 53 which is formed on plate 58, aperture 59 being located near the center of this image. This latter image, i. e. the one formed by secondary beam B is reasonably uniform in brightness over substantially all of its area, and thus substantial displacement of the image in relation to aperture 59, resulting from inaccurate positioning of surface 57, does not materially change the amount of light passing through aperture 59. Thus, an appreciable change in the position of surface 57 can occur without resulting in any appreciable change in the measured light, and hence the measurement of the intensity of light in the image of aperture 53 formed at aperture 59 is for all practical purposes independent of small changes in the position or angle of surface 57.

The light from the image formed at aperture 59 passes therethrough and falls on a photocell 60 connected to an amplifier 61 connected in turn to a galvanometer or the like 62. The voltage resulting from exposure of photocell 60 to the light passing through aperture 59 is amplified by the amplifier and is measured by the galvanometer, which may be calibrated as in the case of galvanometer 37 (Figure 1) as described above. Thus, from a direct reading of the galvanometer, the character of surface 57 being tested may immediately be determined.

From the above, it may be seen that the instrument shown in Figure 2 is capable of accurately measuring the smoothness of a surface, and is furthermore characterized by simplicity and no necessity for critical adjustment, and does not depend in its operation on the use of moving parts.

It will now be noted in the methods and measuring instruments described hereinabove, that a smooth surface is used for purposes for comparison. In a variation of my method, as described below, comparison with a smooth surface is not a requisite, but the nature of the surface being tested may be determined directly. In this variation of my method, a primary beam of light is directed toward a point on the surface to be tested, and this beam may be adjusted through any angle around that point depending on the nature of the surface being tested and the character of the results desired, always, however, directing the primary beam toward that point. The reflection of the primary beam from the surface being tested depends on the characteristics of the surface. Thus, in the case of a relatively smooth surface, the secondary beam will be sharply defined and there will be a relatively small amount of diffused light, whereas if the surface being tested is relatively rough, the secondary beam will not be so sharp and there will be more diffused light. In either event, the secondary beam is intercepted by a plurality of light sensitive elements and measuring elements suitably provided with apertures. These light sensitive and measuring elements are arranged at desired positions so that by a suitable calibration of the measuring portions of the device an accurate measure of the relative light intensities of the secondary beam and of the diffused light at those positions will be given. Thus, the ratio of or the difference between the light intensities of the secondary beam and the diffused light is a measure of the relative smoothness or mirror reflectance of the surface being tested.

This variation of my method also contemplates a stationary light source, and accordingly stationary primary and secondary beams. A light sensitive device and a measuring device, however, may be moved across the secondary beam and thus be exposed to the light intensities of the secondary beam and of the diffused reflected light. At different positions through its path of travel, the light sensitive device causes the measuring device to indicate the different light intensities, and thus a measure of the smoothness of the surface being tested may be made.

With reference to Figure 3, wherein there is schematically shown an instrument capable of carrying out the above-described variation of my method, a light source 63 directs a primary beam of light A toward a point X on a surface 64 being tested. Light source 63 is arranged in any suitable manner for adjustment in an arcuate path about the point X as, for example, to the dotted line position. It should be noted that the primary beam A is always directed toward the point X on surface 64. This adjustment of the light source is utilized for various practical and experimental purposes.

Primary beam A is reflected by surface 64 in accordance with the characteristics of this surface. For example, surface 64 may be comparatively smooth, in which case the reflected light takes the form of a well defined secondary beam B, with relatively weak diffusion from point X, as indicated by the dotted lines with arrows.

A suitable enclosure 65 is provided with an aperture 66 and this enclosure and aperture are so positioned as to intercept secondary beam B, or at least a portion thereof. Enclosure 65 has suitably mounted therein a photocell 67 or the like which when exposed to the light of secondary beam B creates a voltage which may be amplified by an amplifier 68 and measured by a galvanometer 69 which, as described above, indicates the intensity of light passing through aperture 66. A second enclosure 70 includes an aperture 71 and a photocell 72 or the like, all substantially similar to enclosure 65, aperture 66 and photocell 67. Enclosure 70 is located at a suitable angle from secondary beam B, and is positioned so that a portion of the diffused light reflected from surface 64 passes through its aperture 71 to fall on photocell 72. Photocell 72 is also connected to an amplifier (not shown) in turn connected to a galvanometer (not shown) as in the case of photocell 67, so that the intensity of the diffused light may be measured and indicated. Thus, the two galvanometers will indicate voltages of different amplitude, which correspond to the light intensities to which their respective photocells are subjected, and thus the ratio of or the difference between these light intensities is a measure of the relative smoothness of surface 64. From the above, it will be clear that a smooth surface reflects a relatively large amount of light at aperture 66 and a small amount at aperture 71, whereas a rougher surface results in a reduced light intensity at aperture 66, and a greater intensity at aperture 71.

It should be noted that variation of the position of light source 63 necessitates repositioning of photocell 67 so that the photocell is positioned at the angle of the reflected or secondary beam. If desired, the position of photocell 72 may be varied also.

Enclosure 65 with its aperture and photocell may be used to measure light intensities in different positions by moving this enclosure through an arcuate path about point X. Under these circumstances, light source 63 is preferably maintained in a stationary position. Thus, in successive steps, enclosure 65 may be moved over a wide angle as from the solid line to the dotted line position shown in Figure 3 and at successive positions of the enclosure, galvanometer 69 will indicate voltages of different amplitude which correspond to the light intensities at such different points. These differing light intensities, of course, are indicative of the reflection characteristics of surface 64, and may be plotted as shown in Figure 18, which shows the approximate characteristics of three different surfaces, curve S showing the characteristics of a highly polished surface, curve M characterizing a medium smooth surface, and curve G characterizing a ground surface. Thus, the shape of these curves is a reasonably accurate indication of surface reflection characteristics and the sharpness of the rise of the central portion of the curve is a practical measure of surface smoothness. It should also be noted that the maximum heights of these curves give a relative measure of smoothness, and if in comparison a curve of an optically smooth surface is made, the ratios of the maximum heights of the curve to the height of the curve of the optically smooth surface, give the same measure of smoothness or mirror reflectance as described above in connection with the instruments shown in Figures 1 and 2.

In connection with the several embodiments of my surface measuring instrument hereinabove described, it will be noted that surface smoothness comparisons are made by the measurement of relative light intensity of the secondary beam for various surfaces placed in the test position. For different surfaces it will be obvious that the secondary light beam intensities vary over a wide range. To the end of making accurate measurements of such different surfaces, a lamp or light source in the instrument shown in Figure 2, for example, capable of modulation, may be used, as the light source 50. Thus, lamp 50 may be a vapor discharge or a fluorescent lamp which may be modulated at a suitable frequency by the application of a suitable alternating or pulsating voltage. Or again, where light source 50 radiates steady illumination, modulation may be effected by a rotating or vibration shutter (not shown) or by modulating the photocell. Primary beam A, under such circumstances, will then be intermittent, as will also secondary beam B, with the result that photocell 60 will produce a pulsating or varying voltage, in accordance with the modulation of the light source. This varying voltage may, of course, be amplified by simple amplifying means, such as amplifier 61, and the amplified voltage may be used in a galvanometer, such as galvanometer 62, as a measure of the amount of light falling on the photocell. Thus, without the use of moving parts the light intensity of the secondary beam may be accurately measured.

For commercial practice of my method and use of my instrument, as described hereinabove, I have provided the instrument shown in Figure 4, wherein there is shown a work piece 73 having an aperture 74, the surface 75 of which is to be measured.

As more clearly shown in Figures 5 and 6, a housing 76 is divided into two chambers 76a and 76b by a partition 81. In chamber 76a are mounted a light source 77, a transverse partition 78 having an aperture 79, and a lens 80. A viewing head 82 (Figure 5) extends forwardly from housing 76 and has mounted in the end thereof at an angle to the horizontal a reflector 83 (Figure 6) in a position over an aperture 84 at the bottom of the viewing head 82, in which aperture is disposed a lens 85. Chamber 76b (Figure 5) of housing 76 encloses a lens 86, a partition 87 having an aperture 88, and a photocell 89 or the like. Aperture 79 is so arranged with respect to light source 77, lens 80, reflector 83 and lens 85 that an image thereof is formed on test surface 75. Lens 86, aperture 88 and photocell 89 are so arranged in housing chamber 76b with respect to reflector 83 and lens 85, that an intensified area of illumination is formed at aperture 88.

A flexible cable 90 (Figure 4) connects housing 76 with a housing 91 which conveniently houses an amplifier and galvanometer such as hereinbefore described. Flexible cable 90 connects the light source 77 (Figure 5) to a suitable source of electric current 92 (Figure 4) by way of a cable 93, cable 90 also connecting photocell 89 (Figure 5) to the amplifier in housing 91 (Figure 4).

Thus, in operation, the primary beam of light A from light source 77 (Figure 5) passes through aperture 79 and lens 80, and is reflected onto test surface 75 by reflector 83 through lens 85, forming on the test surface an image of aperture 79. The reflected light forms secondary beam B, which passes back through lens 85 and is reflected by reflector 83 through lens 86 to form on aperture 88 an intensified area of uniform illumination to which photocell 89 is exposed. The photocell thus excited creates a voltage which may be amplified by the amplifier in housing 91 (Figure 4) and the amplitude of which is indicated by the galvanometer needle 94.

To facilitate the positioning of viewing head 82 against surface 75 (Figure 7) I preferably provide a pair of rails 95 and 96 or the like which properly position the viewing head with respect to surface 75. Thus, viewing head 82 is always in proper position when an interior surface such as the surface of a round hole is being measured. Rails 95 and 96 also properly position viewing head 82 on the exterior surface of a circular work piece such as surface 97, shown in Figure 8.

It will now be clear that I have provided a method of and apparatus for determining the smoothness of a surface characterized not only by practical simplicity but also by a high degree of accuracy of result in practical use.

As many possible embodiments may be made of the mechanical features of the above invention and as the art herein described might be varied in various parts, all without departing from the scope of the invention, it is to be understood that all matter hereinbefore set forth or shown in the accompanying drawings, is to be interpreted as illustrative and not in a limiting sense.

I claim:

1. In apparatus for determining the smoothness of a ground or polished metallic surface, the combination of a housing, an elongated viewing head of less width than said housing extending therefrom and adapted to be placed parallel with the surface to be analyzed, means forming a viewing opening in a side of said viewing head at the end thereof remote from said housing, a lens mounted in said opening, a source of light in said housing, a photoelectric device in said housing, and an optical system in said housing and said viewing head in cooperating relationship with said lens and adapted to project a primary beam of light on said surface and a reflected beam of light from said surface on said photoelectric device.

2. In apparatus for determining the smoothness of a ground or polished metallic surface, the combination of a housing, an elongated viewing head of less width than said housing extending therefrom and adapted to be placed parallel with the surface to be analyzed, means forming a viewing opening in a side of said viewing head at the end thereof remote from said housing, a lens mounted in said opening, a source of light in said housing, a photoelectric device in said housing, an optical system in said housing and said viewing head in cooperating relationship with said lens and adapted to project a primary beam of light on said surface and a reflected beam of light from said surface on said photoelectric device, and means on said viewing head adapted to rest against said surface for properly positioning said viewing head against said surface.

3. In apparatus for determining the smoothness of a ground or polished metallic surface, the combination of a housing, an elongated viewing head of less width than said housing extending therefrom and adapted to be placed parallel with the surface to be analyzed, means forming a viewing opening in a side of said viewing head at the end thereof remote from said housing, a lens mounted in said opening, a source of light in said housing, a photoelectric device in said housing, an optical system in said housing and said viewing head in cooperating relationship with said lens and adapted to project a primary beam of light on said surface and a reflected beam of light from said surface on said photoelectric device, and means for measuring the magnitude of the electrical value generated by said photoelectric device when said reflected light beam is impressed thereon.

4. In apparatus for determining the smoothness of a ground or polished metallic surface, the combination of a housing, a narrow elongated viewing head secured to said housing and extending a substantial distance therefrom, means forming an opening in one side of said viewing head at a point thereof remote from said housing, a source of light in said housing, a photoelectric device in said housing, a partition member in said housing separating said light source and said photoelectric device, and an optical system in said housing and said viewing head operatively associated with said light source, said photoelectric device and said viewing head opening adapted to project a primary beam of light on said surface and a reflected beam of light from said surface on said photoelectric device, said light beams also being separated by said partition.

HAROLD A. SNOW.